US007212332B2

(12) United States Patent
Chee

(10) Patent No.: US 7,212,332 B2

(45) Date of Patent: May 1, 2007

(54) MICRO-ELECTROMECHANICAL SYSTEM (MEMS) POLYELECTROLYTE GEL NETWORK PUMP

(75) Inventor: Choong Kooi Chee, Penang (MY)

(73) Assignee: Intel Corporation, Santa Clara, CA (US)

(*) Notice: Subject to any disclaimer, the term of this patent is extended or adjusted under 35 U.S.C. 154(b) by 135 days.

(21) Appl. No.: 10/859,561

(22) Filed: Jun. 1, 2004

(65) Prior Publication Data

US 2005/0264903 A1 Dec. 1, 2005

(51) Int. Cl.
*G02F 1/00* (2006.01)
*G02B 26/00* (2006.01)

(52) U.S. Cl. ...................... 359/322; 359/321; 359/290

(58) Field of Classification Search ............... 359/290, 359/291, 295, 298, 224, 321–323; 310/309; 436/523

See application file for complete search history.

(56) References Cited

U.S. PATENT DOCUMENTS 5,250,167 A * 10/1993 Adolf et al. ................ 310/309
5,389,222 A * 2/1995 Shahinpoor ................. 310/309
5,739,946 A * 4/1998 Iwanaga et al. ............ 359/296
5,854,083 A * 12/1998 Chu et al. ................... 436/523
6,381,061 B2 * 4/2002 Levola ....................... 359/291
6,522,452 B2 * 2/2003 Wood ......................... 359/290
6,950,227 B2 * 9/2005 Schrader ..................... 359/320
7,034,415 B2 * 4/2006 Turner et al. ................ 310/36

* cited by examiner

*Primary Examiner*—Ricky Mack
*Assistant Examiner*—Jack Dinh
(74) *Attorney, Agent, or Firm*—Blakely, Sokoloff, Taylor & Zafman LLP

(57) ABSTRACT

According to embodiments of the present invention, a first layer of electrically conductive material may be disposed in a recess in a micro-electromechanical system (MEMS) base. An electrically charged gel network may be disposed in the recess on the first layer of electrically conductive material. A second layer of electrically conductive material may be disposed in the recess on the cross-linked co-polymer gel network. A functionalizer may be disposed on the first and the second layers of electrically conductive material.

12 Claims, 6 Drawing Sheets

MICRO-ELECTROMECHANICAL SYSTEM (MEMS) POLYELECTROLYTE GEL NETWORK PUMP

BACKGROUND

1. Field

Embodiments of the present invention relate to integrated circuit devices and, in particular, to micro-electromechanical system (MEMS) devices.

2. Discussion of Related Art

Micro-electromechanical system (MEMS) technology is a process technology used to combine electrical and mechanical components to create tiny integrated devices (or systems). MEMS devices may be fabricated using integrated circuit (IC) batch processing techniques and may range in size from a few micrometers to millimeters. MEMS devices and systems have the ability to sense, control, and actuate on the micro scale, and generate results on the macro scale. As a result, MEMS technology may be considered one of the most promising technologies for the twenty-first century, having the potential to revolutionize both industrial and consumer products.

There are limitations in MEMS technology, however. For example, the mechanical parts used are motorized and the motorized parts are built into the devices and systems. This makes manufacture of the MEMS devices and systems very costly. Additionally, the movable parts in MEMS are typically produced in low volumes.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
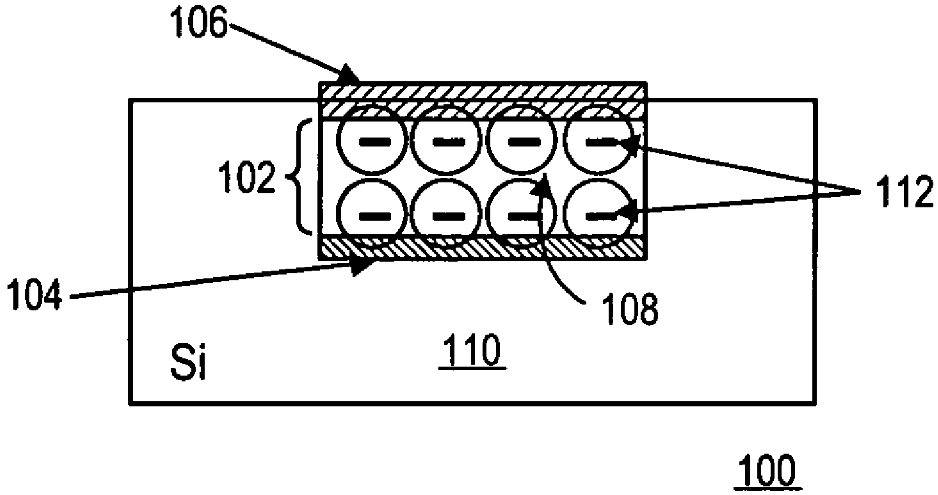
FIG. 1 is a cross-section view of a polyelectrolyte gel network assembly according to an embodiment of the present invention.

FIG. 1 is a cross-section view of a polyelectrolyte gel network assembly 100 according to an embodiment of the present invention. The assembly 100 includes a gel network 102 disposed between two electrically conductive materials 104 and 106. The gel network 102 and materials 104 and 106 may be disposed in a recess 108 of a base 110.

In one embodiment, the gel network 102 may controllably and reversibly alter its conformation, shape, dimensions, polarity, solubility and the like, within the recess 108 in response to a stimulus. For example, the gel network 102 may expand and/or contract in response to an electrical stimulus.

In one embodiment, the gel network 102 includes a polymer, for example, water-soluble. The polymer in the gel network includes several monomers 112. In the illustrated embodiment, the monomers 112 may be anionic monomers (or negatively charged). In embodiments of the present invention, the anionic monomers may be a deprotonated polyacid such as, for example, a carboxylic acid functional group or a sulfonic acid functional group. For example, the anionic monomers may include an acrylic acid functional group, a polyacrylic acid functional group, a polysulfonic acid functional group, or a polyitaconic acid functional group.

In an alternative embodiment, the monomers 112 may be cationic (or positively charged) monomers. In this embodiment, the cationic monomers may be a protonated polyamine such as, for example, a quaternary amine or a protonated tertiary amine.

Figure 2:
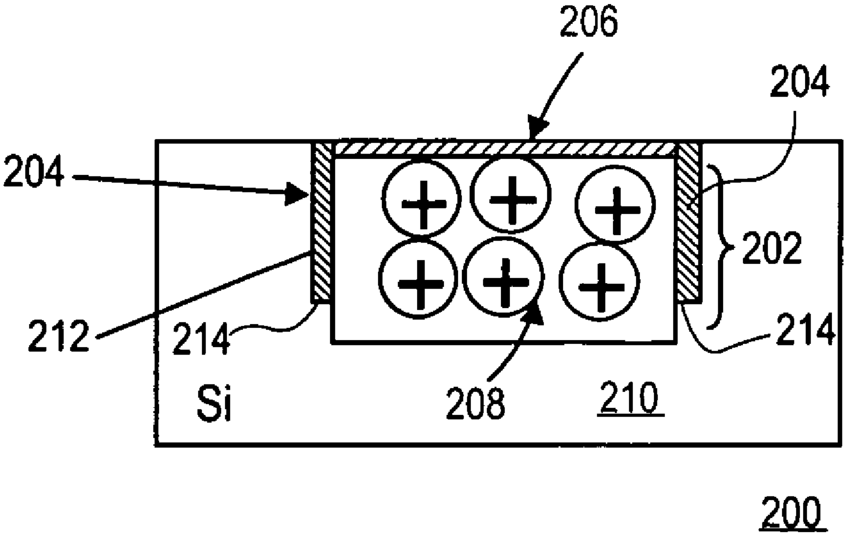
FIG. 2 is a cross-section view of a polyelectrolyte gel network assembly according to an alternative embodiment of the present invention.

FIG. 2 is a cross-section view of a polyelectrolyte gel network assembly 200 according to an alternative embodiment of the present invention. The assembly 200 includes a gel network 202 disposed in a recess 208 of a base 210. Electrically conductive material 204 is disposed, for example, as sidewalls, on ledges 214. Electrically conductive material 206 may be disposed on top of the gel network 202. The example gel network 202 also may controllably and reversibly alter its conformation, shape, dimensions, polarity, solubility and the like, within the recess 208 in response to a stimulus, for example, expand and/or contract in response to an electrical stimulus.

In one embodiment, the ionized pendant groups, for example, cation, anion, in the polymers of the gel networks 102 and/or 202 cause the gel networks 102/202 to be electrically charged, for example, polyelectrolytes. The gel networks 102 and/or 202 may also respond to an electrical stimulus.

Below are examples of negatively charged (anionic) monomers (e.g., polyacrylic acid, a polyitaconic acid) and positively charged (cationic) polyelectrolyte monomers, for example, polysulfonic acid, suitable for use in polyelectrolyte polymers according to embodiments of the present invention.

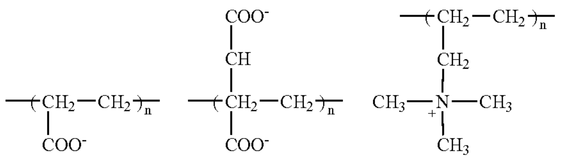

Polyacrylic acid Polyitaconic acid Poly quaternary-amine

The polymers in the gel network 102/202 also may reversibly and selectively bind to other molecules. In embodiments of the present invention, the gel network 102/202 includes a cross-linking agent that creates bonds between adjacent polymer chains. Accordingly, the gel network 102/202 may be referred to as a cross-linked copolymer gel network.

In one embodiment, the cross-linking agent includes bisacrylamide. Alternatively, the cross-linking agent may include divinyl benzene. Of course, the cross-linking agent may be any suitable agent that creates bonds between adjacent polymer chains depending on the particular polymer.

In embodiments, the materials 104/204 and 106/206 may be any suitable electrically conductive metal, for example, gold (Au), aluminum (Al), copper (Cu), silver (Ag). In other embodiments, the materials 104/204 and 106/206 may be other suitable electrically conductive metals. In one embodiment, the materials 104/204 and/or 106/206 may be deposited materials. In other embodiments, the materials 104/204 and/or 106/206 may be plates positioned in the recess 108/208.

In embodiments of the present invention, the surfaces of the materials 104/204 and 106/206 have been functionalized with a suitable molecular species to facilitate covalent bonding of the polyelectrolyte monomer and cross-linking to the metal surfaces of the materials 104/204 and 106/206. In one embodiment, a mercaptoacetic acid, for example, $HSCH_2COOH$ may be grafted to the gold (Au) materials 104/204 and 106/206 to functionalize them. Other molecular species suitable for functionalizing the materials 104/204 and 106/206 include thioglycolic acid and ethanethiol-2-acid-1.

In embodiments of the present invention, the material 106/206 may be movable such that when the gel network 102/202 expands or contracts, the material 106/206 moves upwards or downwards to push or pull, respectively, the material 106/206 vertically in the recess 108/208.

In an embodiment, the recess 108/208 may be a narrow trench, a well, a cutout, a groove, an opening, or other void suitable for disposing the materials 104/204/106/206.

In one embodiment, the base 110/210 may be silicon. In alternative embodiments, the base 110/210 may be a microelectromechanical system (MEMS) base. Alternatively, still, the base 110/210 may be a polymer base, such as, for example, a thermoset polymer base, or a ceramic base.

Of course, other suitable monomer, polymers, and cross-linkers implemented using free radical polymerization, living free radical polymerization, redox polymerization, or cationic mechanisms, for example, may be implemented in embodiments of the present invention. Additionally, other bases, electrically conductive materials, and materials for functionalizing may be used depending on the particular polyelectrolyte gel pump application. After reading the description herein a person of ordinary skill in the relevant art will readily recognize how to implement embodiments of the present invention using various other monomers, polymers, cross-linking agents, conductive materials, and/or functionalizing materials.

Figure 3:
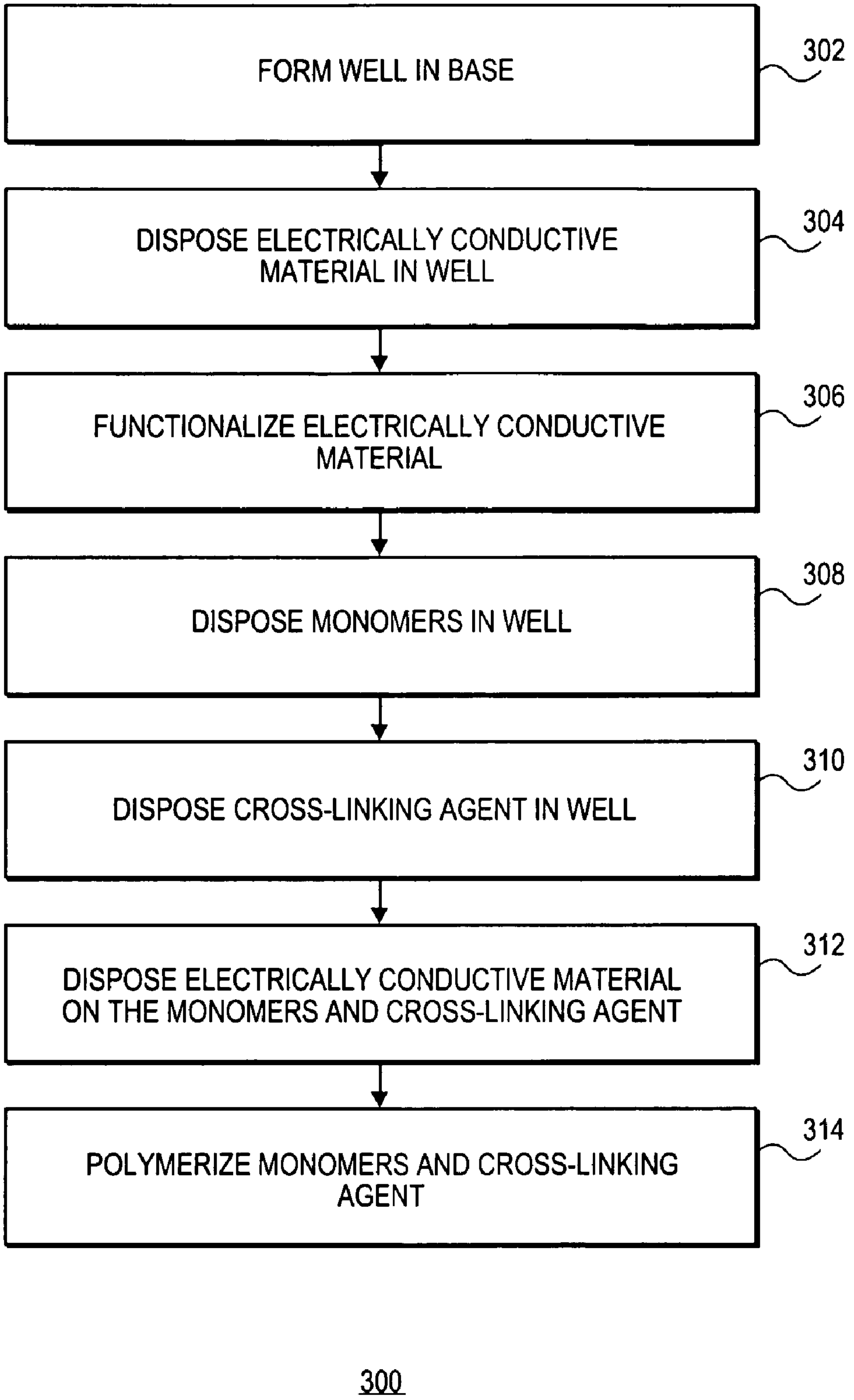
FIG. 3 is a flowchart illustrating process for fabricating the assembly illustrated in FIG. 1 according to an embodiment of the present invention.

FIG. 3 is a flowchart illustrating process 300 fabricating the assembly 100 according to an embodiment of the present invention. The operations of the process 300 are described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented.

Of course, the process 300 is an example process and other processes may be used to implement embodiments of the present invention. A machine-accessible medium with machine-readable instructions thereon may be used to cause a machine, for example, a processor to perform the process 300.

In a block 302, the recess 108 may be formed in the base 110. In one embodiment, the base 110 may be etched using known etching techniques to form the recess 108.

In a block 304, the material 104 may be disposed in the recess 108. In one embodiment, the material 104 may be deposited using deposition techniques such as, for example, chemical vapor deposition (CVD) or other suitable deposition technique.

In a block 306, the materials 104 and 106 may be functionalized.

In a block 308, negatively charged monomers may be disposed in the recess 108.

In a block 310, a cross-linking agent may be disposed in the recess 108.

In a block 312, the material 106 may be disposed on the monomers and the cross-linking agent.

In a block 314, the monomers and the cross-linking agent may be polymerized. For example, the molecules of the monomers and the cross-linking agent may be joined to form larger molecules. In one embodiment, polymerization of the monomers and cross-linking agent may be accomplished thermally, such as, for example, by exposure to heat, or photo-chemically, such as, for example by exposure to ultra-violet rays. Low temperature redox polymerization also may be used to polymerize monomers and cross-linking agents.

In an alternative embodiment, polymerization may be accomplished using light-induced chemical bonding, for example using visible light, infrared light, near infrared light, ultraviolet (UV) light, red light, blue light, laser light, and the like. In this and other embodiments, a suitable initiator may be included to initiate the reaction. In this and other embodiments, the polymer backbone may include the functional groups that undergo light-induced chemical bonding with each other, or the functional groups may be pendant. In still other embodiments, other reactions may include redox type of free radical reactions, living free radical polymerization, or other suitable reactions.

In an embodiment of the present invention, synthesis of the monomers and cross-linking agent may occur in bulk. In alternative embodiments, synthesis of the monomers and cross-linking agent may occur in solution, in suspension, in emulsion, etc.

Below is an example of an anionic polyelectrolyte gel network, such as, for example, the gel 102, according to an embodiment of the present invention. In the illustrated example embodiment, the polyelectrolyte gel network may be a polyacrylic acid gel network, with the monomers being acrylic acid and the cross-linking agent being bisacrylamide.

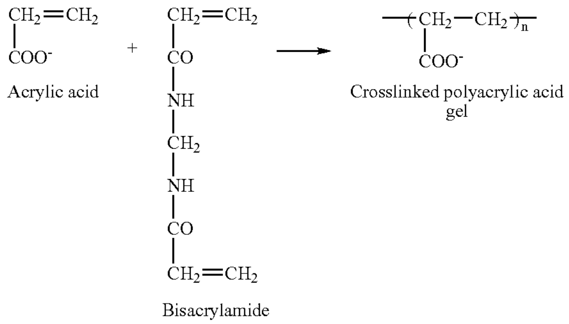

Figure 4:
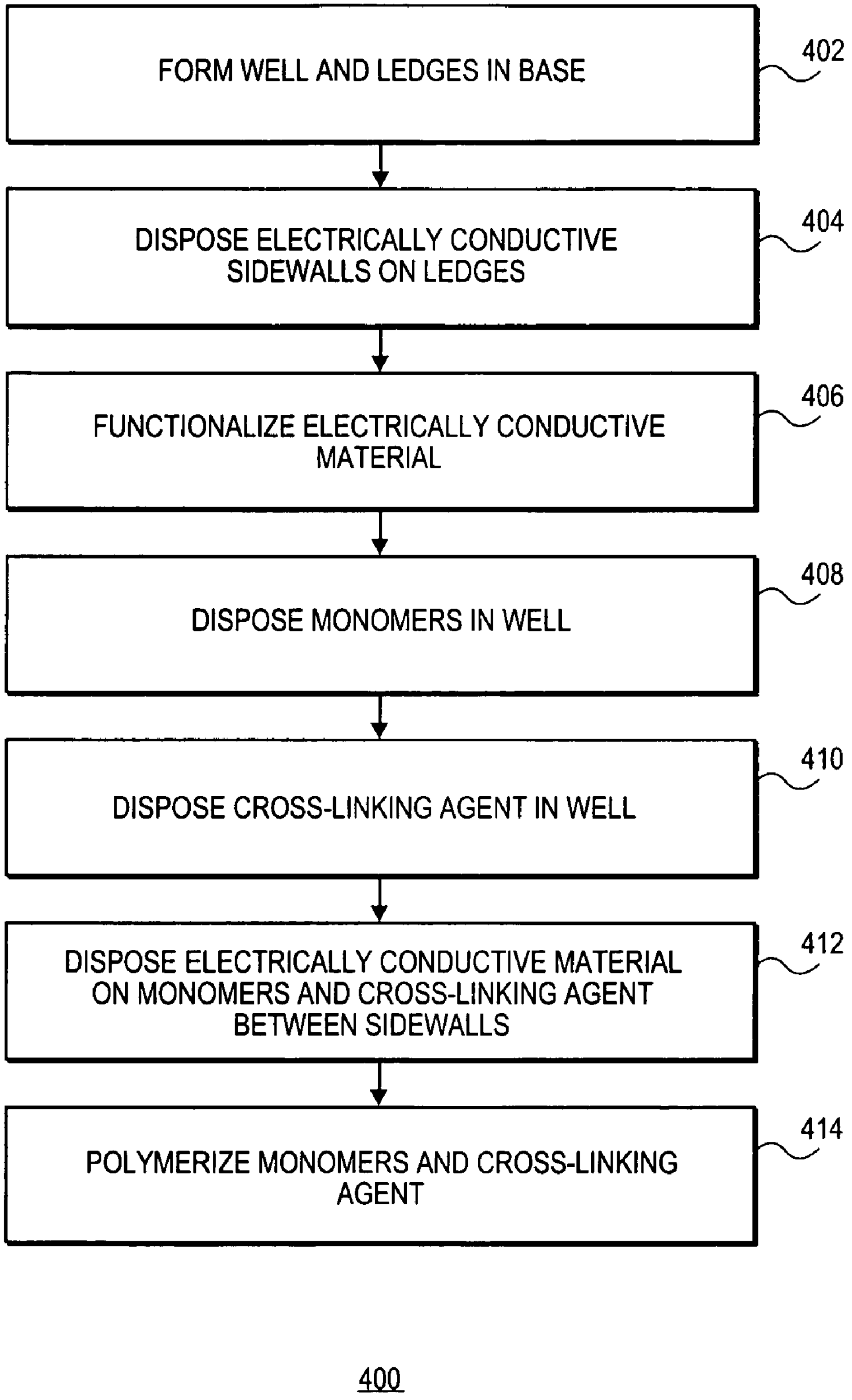
FIG. 4 is a flowchart illustrating process for fabricating the assembly illustrated in FIG. 2 according to an embodiment of the present invention.

FIG. 4 is a flowchart illustrating process 400 for fabricating the assembly 200 according to an embodiment of the present invention. The operations of the process 400 may be described as multiple discrete blocks performed in turn in a manner that may be most helpful in understanding embodiments of the invention. However, the order in which they are described should not be construed to imply that these operations are necessarily order dependent or that the operations be performed in the order in which the blocks may be presented.

Of course, the process 400 is an example process and other processes may be used to implement embodiments of the present invention. A machine-accessible medium with machine-readable instructions thereon may be used to cause a machine (e.g., a processor) to perform the process 400.

In a block 402, the ledges 214 and the recess 208 may be formed in the base 210. In one embodiment, the ledges 214 may be etched using known etching techniques.

In a block 404, the sidewalls 204 may be disposed on the ledges 214.

In a block 406, the sidewalls 204 and material 206 may be functionalized.

In a block 408, positively charged monomers may be disposed in the recess 108.

In a block 410, a cross-linking agent may be disposed in the recess 108.

In a block 412, the material 106 may be disposed on the monomers and the cross-linking agent between the sidewalls 214.

In a block 414, the monomers and the cross-linking agent may be polymerized to form the gel network 202.

Figure 5:
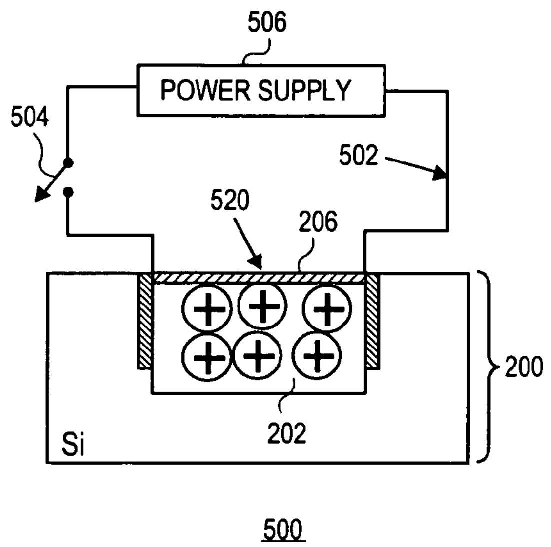
FIG. 5 is a schematic diagram of a polyelectrolyte gel pump according to an embodiment of the present invention.

FIG. 5 is a schematic diagram of a polyelectrolyte gel pump 500 according to an embodiment of the present invention. In the illustrated embodiment, the pump 500 includes the assembly 200 (including the movable electrically conductive material 206 and the positively charged gel network 202) coupled to an electrical circuit 502. The electrical circuit 502 includes a switch 504 that enables an electrical charge from a power supply 506 to be applied to or removed from the movable electrically conductive material 206 depending on whether the switch 504 is open or closed. When the switch 504 is open, as is illustrated in FIG. 5, the movable electrically conductive material 206 may be in a position 520 (e.g., neutral position) because no electrical charge is being applied to the gel network 202 from the power supply 506.

Figure 6:
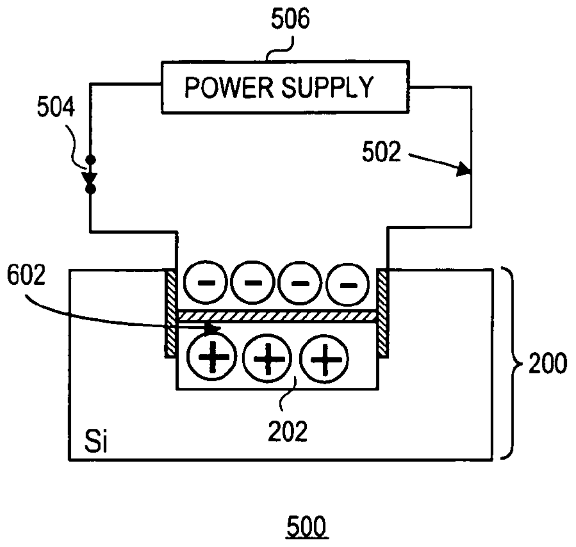
FIG. 6 is a schematic diagram of the polyelectrolyte gel pump depicted in FIG. 5 according to an alternative embodiment of the present invention.

FIG. 6 is a schematic diagram of the pump 500 with the switch 504 closed according to an embodiment of the present invention. When the switch 504 is closed, a negative electrical charge may be applied to the movable electrically conductive material 206 from the power supply 506. The positively charged gel network 202 contracts and pulls the negatively charged movable electrically conductive material 206 into a position 602 (e.g., opposite charges attract).

When the switch 504 is re-opened, the positively charged gel network 102 expands back to the position 520 and pushes the neutrally charged movable electrically conductive material 206 back into the position 520. FIG. 5 illustrates the switch 504 being open.

Although depicted as a binary operation (e.g., the gel network 202 being fully expanded or fully contracted in response to a charge being applied or removed), operation of the assembly 200 may be a modulated operation. For example, the magnitude of the negative charges applied to the movable electrically conductive material 206 from the power supply 506 may be variable such that the positively charged gel network 102 contracts/expands and pulls/pushes the negatively charged movable electrically conductive material 206 into any position in between the positions 520 and 602 (e.g., the gel network 202 may be somewhere in between fully contracted and fully expanded).

Alternatively, rather than applying and removing a negative charge, using a switch, for example, charge may be alternated between a negative to contract the positively charged gel network 102 and a positive to expand the positively charged gel network 102, using an alternating current (AC) signal for example. After reading the description herein a person of ordinary skill in the relevant art will readily recognize how to implement embodiments of the present invention for modulated operation of the pump 500.

Figure 7:
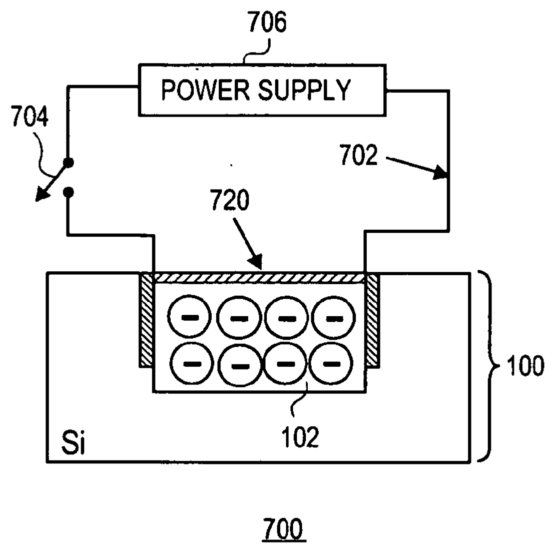
FIG. 7 is a schematic diagram of a polyelectrolyte gel pump according to an alternative embodiment of the present invention.

FIG. 7 is a schematic diagram of a polyelectrolyte gel pump 700 according to an alternative embodiment of the present invention. In the illustrated embodiment, the pump 700 includes the assembly 100 (including the movable electrically conductive material 106 and the negatively charged gel network 102) coupled to an electrical circuit 702. The electrical circuit 702 includes a switch 704 that enables an electrical charge from a power supply 706 to be applied to or removed from the movable electrically conductive material 106.

When the switch 704 is open, the movable electrically conductive material 106 may be in a position 720 (e.g., neutral position) because no electrical charge is being applied to the gel network 102 from the power supply 706.

Figure 8:
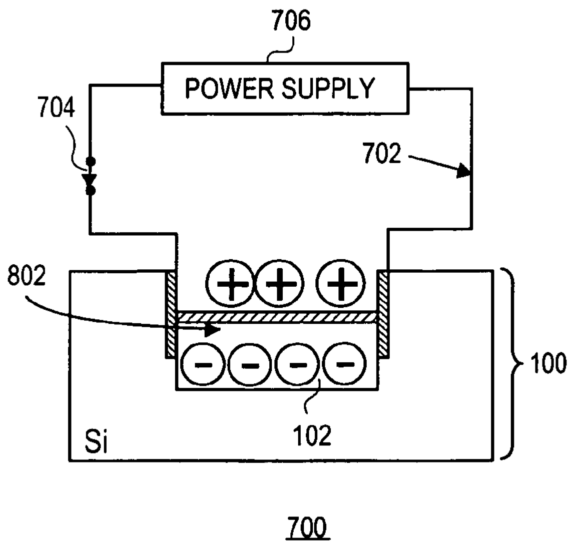
FIG. 8 is a schematic diagram of the polyelectrolyte gel pump depicted in FIG. 7 according to an alternative embodiment of the present invention.

FIG. 8 is a schematic diagram of the pump 700 with the switch 704 closed according to an embodiment of the present invention. When the switch 704 is closed, a positive electrical charge may be applied to the movable electrically conductive material 106 from the power supply 706. The negatively charged gel network 102 contracts and pulls the positively charged movable electrically conductive material 106 into a position 802.

When the switch 704 is re-opened, the negatively charged gel network 102 expands back to the position 720 and pushes the neutrally charged movable electrically conductive material 206 back into the position 720. FIG. 7 illustrates the switch 704 being open.

Figure 9:
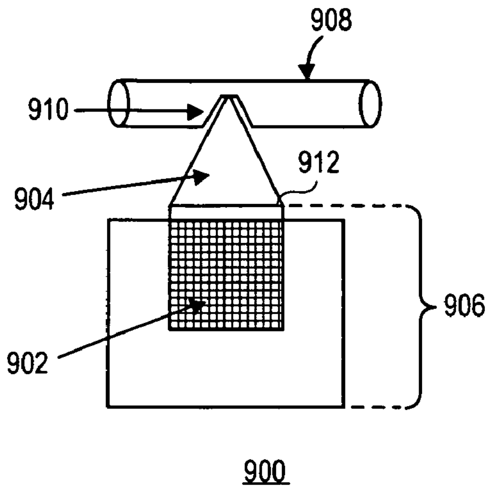
FIG. 9 is a cross-section view of a MEMS valve according to an embodiment of the present invention.

FIG. 9 is a cross-section view of a MEMS valve 900 according to an embodiment of the present invention. The MEMS valve 900 includes a gel network 902 having electrically conductive material 912 coupled to a wedge 904. The gel network 902 may be part of a polyelectrolyte gel network pump 906 (the electrical stimulus is not shown). In this embodiment, no electrical stimulus may be applied to the pump 906 and the gel network 902 may be expanded, pushing or holding the electrically conductive material 912 up to insert the wedge 904 in a flow path 910 of tubing 908 (or other suitable flow director).

Figure 10:
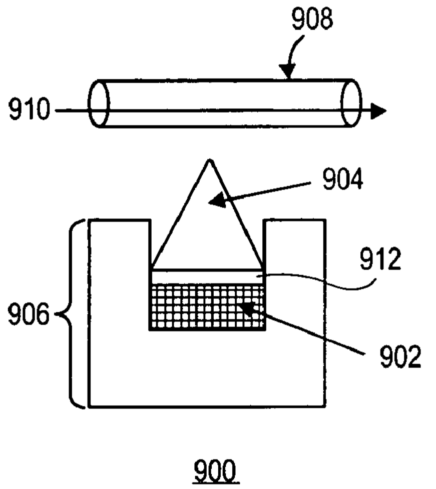
FIG. 10 is a cross-section view of a MEMS pump according to an embodiment of the present invention.

FIG. 10 is a schematic diagram of the MEMS valve 900 according to an alternative embodiment in which an electrical stimulus may be applied to the movable electrically conductive material 912. When the electrical stimulus is applied to the movable electrically conductive material 912, the gel network 902 contracts and pulls the movable electrically conductive material 912 down to remove the wedge 904 from the flow path 910 of tubing 908.

Figure 11:
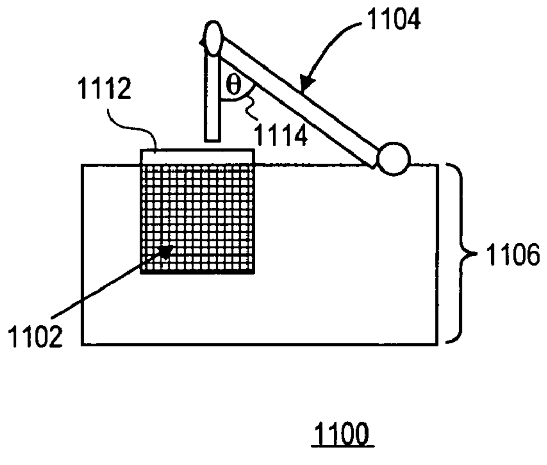
FIG. 11 is a cross-section view of a MEMS assembly according to an embodiment of the present invention.

FIG. 11 is a cross-section view of a MEMS assembly 1100 according to an embodiment of the present invention. The MEMS assembly 1100 includes a gel network 1102 having electrically conductive material 1112 coupled to a hinge 1104. The gel network 1102 may be part of a polyelectrolyte gel network pump 1106 (the electrical stimulus is not shown). In this embodiment, no electrical stimulus may be applied to the pump 1106 and the gel network 1102 may be expanded, pushing or holding the electrically conductive material 1112 up to give the hinge 1104 an angle 1114.

Figure 12:
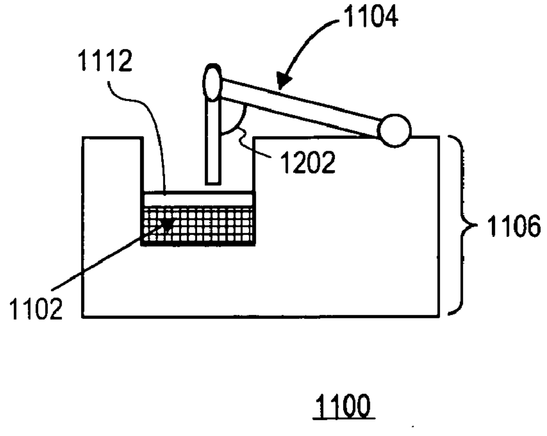
FIG. 12 is a schematic diagram of the MEMS assembly depicted in FIG. 11 according to an alternative embodiment of the present invention.

FIG. 12 is a schematic diagram of the MEMS assembly 1100 according to an alternative embodiment in which an electrical stimulus may be applied to the movable electrically conductive material 1112. When the electrical stimulus is applied to the movable electrically conductive material 1112, the gel network 1102 contracts and pulls the movable electrically conductive material 1112 down to move the hinge 1104 and give it an angle of 1202.

Figure 13:
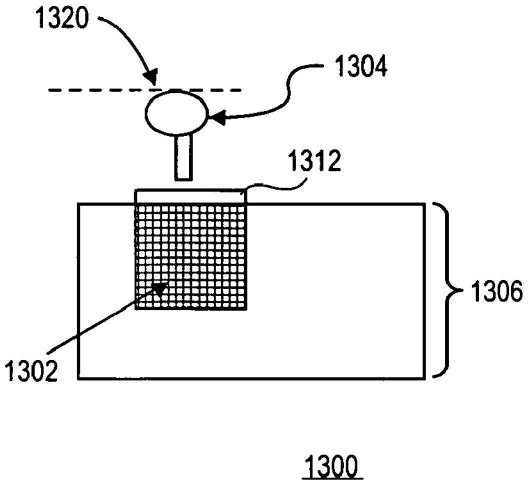
FIG. 13 is a cross-section view of a MEMS assembly according to an alternative embodiment of the present invention.

FIG. 13 is a cross-section view of a MEMS assembly 1300 according to an embodiment of the present invention. The MEMS assembly 1300 includes a gel network 1302 having electrically conductive material 1312 coupled to a mirror 1304 (e.g., concave, convex, flat). The gel network 1302 may be part of a polyelectrolyte gel network pump 1306 (the electrical stimulus is not shown). In this embodiment, no electrical stimulus may be applied to the pump 1306 and the gel network 1302 may be expanded, pushing or holding the electrically conductive material 1312 up to a position 1320.

Figure 14:
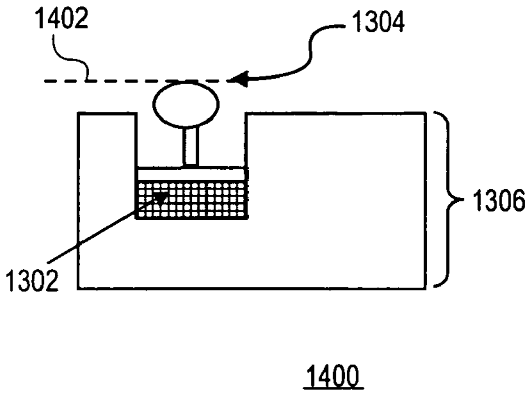
FIG. 14 is a schematic diagram of the MEMS assembly depicted in FIG. 13 according to an alternative embodiment of the present invention.

FIG. 14 is a schematic diagram of the MEMS assembly 1300 according to an alternative embodiment in which an electrical stimulus may be applied to the movable electrically conductive material 1312. When the electrical stimulus is applied to the movable electrically conductive material 1312, the gel network 1302 contracts and pulls the movable electrically conductive material 1312 down to move the mirror 1304 to a position 1402.

Figure 15:
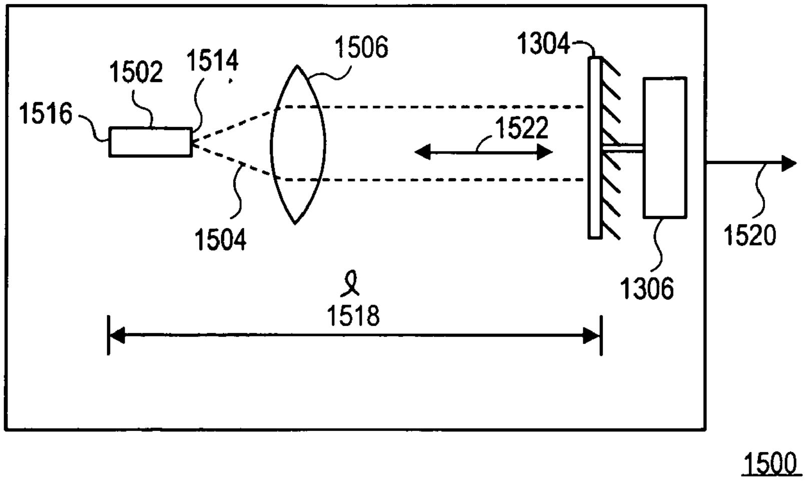
FIG. 15 is a schematic diagram of a tunable external cavity laser according to an embodiment of the present invention.

FIG. 15 shows a tunable external cavity laser 1500 according to an embodiment of the present invention. The laser 1500 includes a laser diode 1502 that emits a light beam 1504. A lens 1506 collimates the light beam 1504 and causes the beam to be incident on the mirror 1304. The laser diode 1502 has a front facet 1514 coated with an anti-reflective (AR) material that allows the light beam 1504 to be optically coupled into and out of the laser diode 1502 to the lens 1506 and prevents loss of light energy for situations involving stray reflections. The laser diode 1502 has a back facet 1516 coated with a highly reflective material that causes the light beam 1504 to be reflected back into the laser diode 1502.

The mirror 1304 and the reflective back facet 1516 form a cavity 1518 that has an optical length l in which the light beam 1504 at a selected wavelength may be reflected back and forth. The light beam 1504 may be amplified in the process and a light beam 1520 at the selected wavelength may be output by the laser 1500. As is known, there may be other optical devices (gratings, etalons), positioned in the cavity 1518 and that may be optically operable within the laser 1500.

In embodiments of the present invention, the polyelectrolyte gel network pump 1306 may translate the mirror 1304 along the light beam 1504 (e.g., in the directions indicated by an arrow 1522) to change the optical path length l. Changing the optical path length l affects the wavelength of the laser 1500.

Embodiments of the present invention may be implemented using hardware, software, or a combination thereof. In implementations using software, the software may be stored on a machine-accessible medium.

A machine-accessible medium includes any mechanism that may be adapted to store and/or transmit information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as recess as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, recess-known structures or operations are not shown or described in detail to avoid obscuring the understanding of this description.

Reference throughout this specification to “one embodiment” or “an embodiment” means that a particular feature, structure, process, block, or characteristic described in connection with an embodiment is included in at least one embodiment of the present invention. Thus, the appearance of the phrases “in one embodiment” or “in an embodiment” in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:

a first layer of electrically conductive material disposed in a recess in a micro-electromechanical system (MEMS) base;

an electrically charged cross-linked co-polymer gel network disposed in the recess on the first layer of electrically conductive material;

a second layer of electrically conductive material disposed in the recess on the cross-linked co-polymer gel network; and a functionalizer disposed on the first and the second layers of electrically conductive material.

2. The apparatus of claim 1, wherein the MEMS base includes at least one of a silicon, a polymer, a ceramic base.

3. The apparatus of claim 2, wherein the polymer is a thermoset polymer.

4. The apparatus of claim 1, wherein the first and/or the second layer of electrically conductive material includes gold (Au).

5. The apparatus of claim 1, wherein the electrically charged gel network includes electrically charged monomers and a cross-linking agent.

6. The apparatus of claim 5, wherein the electrically charged monomers are anionic or cationic.

7. The apparatus of claim 6, wherein the electrically charged monomers include at least one of a carboxylic acid functional group or a sulfonic acid functional group.

8. The apparatus of claim 7, wherein the electrically charged monomers include at least one of a polyacrylic acid, a polyitaconic acid, or a polysulfonic acid.

9. The apparatus of claim 5, wherein the electrically charged monomers include a polyamine.

10. The apparatus of claim 9, wherein the electrically charged monomers include at least one of a quaternary amine or a protonated tertiary amine.

11. The apparatus of claim 5, wherein the cross-linking agent includes at least one of a bisacrylamide or divinyl benzene.

12. The apparatus of claim 1, wherein the functionalizer includes a mercaptoacetic acid.

* * * * *